June 2, 1931.

C. F. ROBERTS

THREAD SWELLING TOOL

Original Filed Aug. 30, 1928

Re. 18,086

Inventor

Charles F. Roberts

By Thomas L. Wilder

Attorney

Reissued June 2, 1931

Re. 18,086

UNITED STATES PATENT OFFICE

CHARLES F. ROBERTS, OF UTICA, NEW YORK, ASSIGNOR TO HERBERT S. POWELL, OF UTICA, NEW YORK

THREAD SWELLING TOOL

Original No. 1,762,562, dated June 10, 1930, Serial No. 303,089, filed August 30, 1928. Application for reissue filed March 16, 1931. Serial No. 524,418.

The object of the invention is to provide a tool for bulging or swelling the threads of a bolt at spaced points on its circumference directly behind an attached nut, so as to positively prevent recession or reverse turning movement of the latter.

With this object in view, the invention consists in a construction and combination of parts of which a preferred embodiment is illustrated in the accompanying drawings, wherein.

Figures 1, 2, 3:
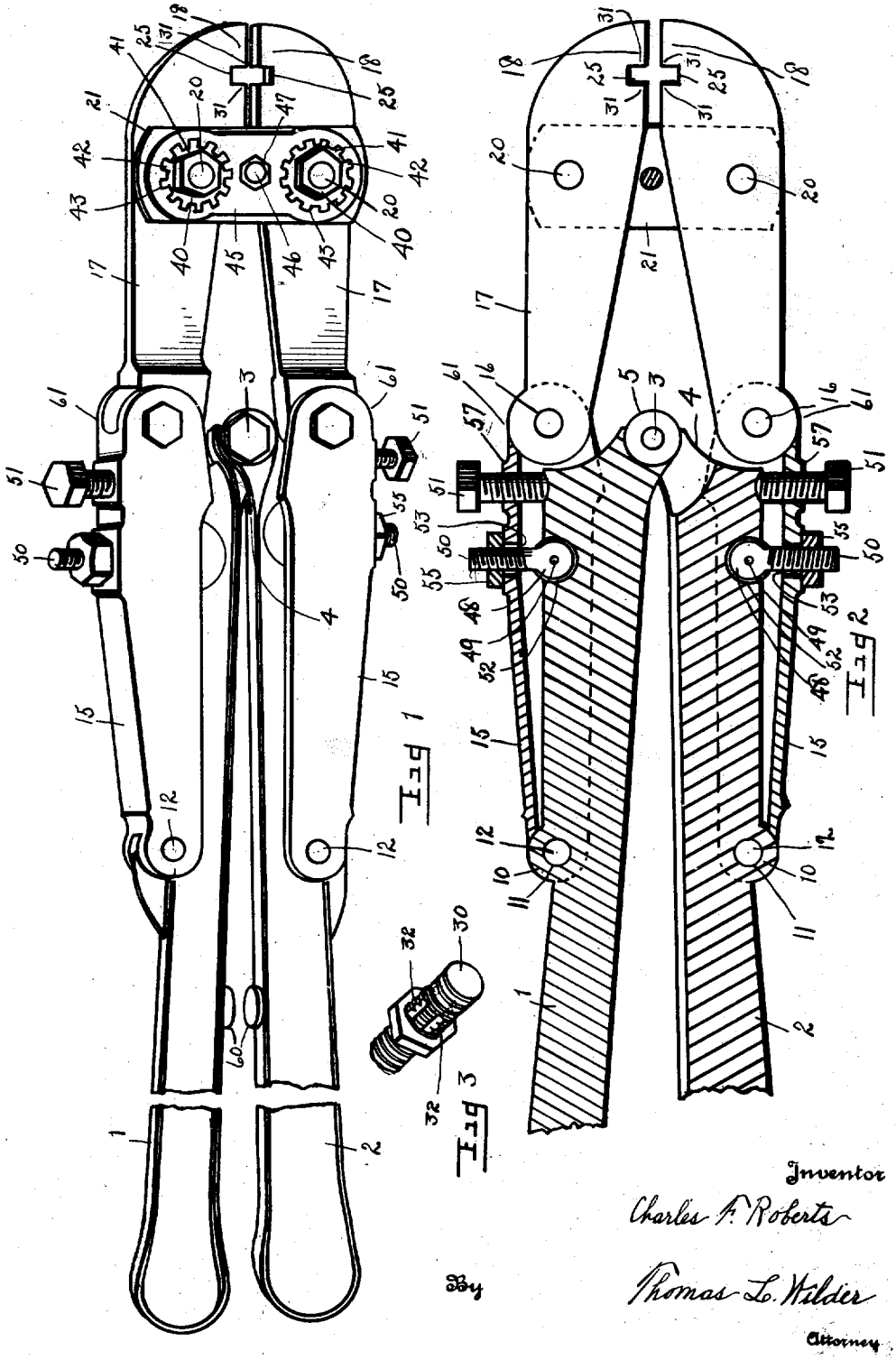
Figure 1 is a perspective view of the tool embodying the invention.
Figure 2 is a longitudinal sectional view in the plane of the jaw carrying levers.
Figure 3 is a detail perspective view showing a portion of a bolt and its attached nut with the threads of the former swollen or bulged by the operation of the tool.

Referring more particularly to the drawings, the device embodies handles 1, 2 that are pivoted together at 3. For this purpose handle 2 is forked at 4 to form a recess for the reception of annular tongue 5 of handle 1. Each of the handles 1 and 2 has a bearing part 10 with an aperture 11 for the reception of a shaft 12 upon which a channel link 15 is pivoted. The ends of each of the shafts 12, 12 are spread to hold it in assembled position. The channel links 15, 15 straddle the upper edges of handles 1 and 2 respectively and are in turn pivoted at 16, 16 to the two levers 17, 17. Each of the levers 17, 17 is fulcrumed upon a headed bolt 20 carried in clamping plates 21, 21 that are disposed on opposite sides of said levers 17, 17.

The forward or free ends of the levers 17, 17 constitute jaws 18, 18 of which both are formed on their facing edges with slots 25, 25. The side walls of the slots together with the adjacent edges of the jaws outline teeth 31 which, by reason of the slots, are spaced apart on each jaw and likewise spaced apart on the two jaws because of the separation of the two.

Nuts 40, 40 that are mounted on the headed bolts 20, 20 are in each instance equipped with annular flanges 41, 41 having peripheral teeth 42 which fit into recesses 43 made in plate 45 that is mounted thereover, whereby to prevent nuts 40 from turning off bolts 20, 20. The clamping plates 21, 21 are held together by a headed bolt 46 passing through the center thereof and by nut 47 mounted on said bolt 46.

The adjustment of the jaws 18, 18 to regulate the spacing thereof contemplates the movement of channel links 15, 15 on their respective pivots 12, 12 relative to handles 1 and 2. Said channel links 15, 15 are held in this given relation to handles 1 and 2 respectively by employing in each instance two bolts, 50 and 51. Bolt 50 has a flat annular lower part 48 pivoted on a pin 49 disposed transversely through the handle. An aperture 52 is made in the handle for the reception of the lower flat annular part 48 of bolt 50. The upper end of bolt 50 projects through an enlarged recess 53 formed in the respective channel link 15. A nut 55 is mounted on the upper end of bolt 50, whereby to limit the outward swing of the channel link 15. The swing of the channel link in the opposite direction is determined by set bolt 51 mounted in a threaded aperture in the enlarged part 57 of the channel link. The lower ends of set bolts 51 abut against the top surfaces of handles 1 and 2 in seats slightly concaved for the purpose, whereby to limit the inward swing of the channel links. The combination of bolts 50 and 51 in each set will by adjustment determine the relative positions of the outer or free ends of channel links 15, 15 and thereby determine the spacing of jaws 18, 18.

Members 60, 60 composed of some resilient material like rubber are fastened to the inner sides of handles 1 and 2 and are adapted to register with each other, whereby to lessen the impact when handles 1 and 2 are brought together.

The operation of the device is effected by first adjusting each set of bolts 50 and 51, whereby to govern the initial spacing of jaws 18, 18 to accord with the size of the bolt to be operated upon, such as the bolt 30. Bolt 30 is then placed between jaws 18, 18 in such manner that its threaded part will rest crosswise thereof and be partially within the slots 25, 25, so as to be in edge contact with the teeth 31. Handles 1 and 2 are moved toward each other thereby swinging the free ends 61, 61 of channel links 15, 15 outward. The outward movement of ends 61, 61 will cause levers 17, 17 to rock on their pivots 20, 20 in such manner that jaws 18, 18 will move inwardly towards each other whereby opposing teeth 31 of jaws 18 will cut opposite surfaces of bolt 30 and pinch the threaded portions outward to form swellings or protuberances 32 adapted to prevent any nut mounted on said bolt 30 from turning thereoff.

It will be noted that jaws 18, 18 move in the opposite direction to handles 1 and 2. This is made possible by the use of channel links 15, 15. Furthermore it has its advantages in that it allows the user to exercise a greater leverage upon jaws 18, 18 by means of handles 1 and 2.

The invention having been described, what is claimed as new and useful is:

1. A thread swelling tool having cooperating jaws and means for actuating the same, said jaws being provided each on its work engaging face with a limited number of teeth materially spaced apart for penetration into the threads of an interposed bolt at spaced points to force the intervening portions of the bolt beyond the normal periphery thereof.

2. A thread swelling tool having cooperating jaws and means for actuating the same, said jaws being provided each on its work engaging face with a limited number of transversely arranged teeth materially spaced apart for penetration into the threads of an interposed bolt axially of the latter and at spaced points to force the intervening portions of the bolt beyond the normal periphery thereof.

3. A thread swelling tool having cooperating jaws and means for actuating the same, said jaws being slotted on their work engaging faces to form teeth of which each is defined by one wall of a slot and the adjacent work engaging face.

4. A thread swelling tool having cooperating jaws, means for actuating the same to move the jaws towards each other, and means for adjusting the jaws to regulate their spacing to accord with the size of a bolt to be operated upon, said jaws being provided each on its work engaging face with a limited number of teeth materially spaced apart for penetration into the threads of the bolt at spaced points to force the intervening portions of the bolt beyond the normal periphery thereof.

5. A thread swelling tool having cooperating jaws, means for actuating the same to move the jaws towards each other, and means for adjusting the jaws to regulate their spacing to accord with the size of a bolt to be operated upon, said jaws being provided each on its work engaging face with a limited number of transversely arranged teeth materially spaced apart for penetration into the threads of the bolt axially of the latter and at spaced points to force the intervening portions of the bolt beyond the normal periphery thereof.

6. A thread swelling tool having cooperating jaws, means for actuating the same to move the jaws towards each other, and means for adjusting the jaws to regulate their spacing to accord with the size of a bolt to be operated upon, said jaws being slotted on their work engaging faces to form teeth of which each is defined by one wall of a slot and the adjacent work engaging face.

In witness whereof he hereunto affixes his signature.

CHARLES F. ROBERTS.